United States Patent [19]

Antila

[11] Patent Number: 5,147,016
[45] Date of Patent: Sep. 15, 1992

[54] LUBRICATING GREASE DOSER ARRANGEMENT WITH IMPROVED FLOW CONTROL, FOR PREVENTING LUBRICANT OIL-HARDENER SEPARATION

[75] Inventor: Kari Antila, Korpilahti, Finland
[73] Assignee: Safematic OY, Muurame, Finland
[21] Appl. No.: 741,659
[22] Filed: Aug. 7, 1991

[30] Foreign Application Priority Data

Jun. 10, 1991 [FI] Finland .................. 912786

[51] Int. Cl.$^5$ .............................................. F16N 27/00
[52] U.S. Cl. ................................. 184/7.4; 137/625.17
[58] Field of Search ............... 184/7.4, 6.28, 40, 41, 184/42, 45.1; 137/625.17

[56] References Cited

U.S. PATENT DOCUMENTS

| | | | |
|---|---|---|---|
| 2,126,451 | 8/1938 | Creveling | 184/7.4 |
| 2,505,522 | 4/1950 | Brownstein | 184/7 |
| 2,699,842 | 1/1955 | Juettner | 184/7 |
| 2,766,847 | 10/1956 | Harter | 184/7.4 |
| 3,172,578 | 3/1965 | Kemp | 184/7.4 |
| 4,580,602 | 4/1986 | Boody | 137/625.17 |
| 4,676,141 | 6/1987 | Park | 137/625.17 |
| 4,691,618 | 9/1987 | Poling | 137/625.17 |

FOREIGN PATENT DOCUMENTS

1003520 2/1957 Fed. Rep. of Germany .

*Primary Examiner*—Ira S. Lazarus
*Assistant Examiner*—Alan B. Cariaso
*Attorney, Agent, or Firm*—Cushman, Darby & Cushman

[57] ABSTRACT

A lubricant doser, assembly in which each doser includes a dosing cylinder and a dosing piston moving therein as well as conduits and other structure for leading lubricant alternately to both sides of the piston, including a stem in the cylinder, the stem both moving back and forth in the axial direction and turning about the longitudinal axis of symmetry thereof. The stem is provided with channels so that, by the movement of the stem the lubricant is allowed to flow to one side of either the control valve or the dosing piston depending on the doser, and accordingly by each next movement of the stem following a backward motion, to the other side of either the control valve or the dosing piston.

6 Claims, 6 Drawing Sheets

LUBRICATING GREASE DOSER ARRANGEMENT WITH IMPROVED FLOW CONTROL, FOR PREVENTING LUBRICANT OIL-HARDENER SEPARATION

BACKGROUND OF THE INVENTION

The present invention relates to a lubricant doser comprising a body having a dosing cylinder and a dosing piston moving axially therein, and means for leading lubricant alternately to both sides of the dosing piston.

It is previously well known in the field to lubricate a plurality of lubrication points using a common fixed lubricant source. In this kind of centered lubrication system, a sufficient number of dosers is installed in the vicinity of the lubrication points, one doser usually servicing two lubrication points. The dosers are connected with pipes to a pump that feeds the lubricant to the dosers at intervals determined by a control unit, the dosers each dispensing a desired quantity of the lubricant, as directed, and pressing each lubricant dose to the lubrication point. A control valve in each doser leads the lubricant dispensed by the respective dosing piston to both respective lubrication points in turn.

Most of the previously known central lubrication systems include two pipes, each of the dosers being connected to the pump with two body pipes through which the lubricant is fed to each doser in turn. The movements of the control valve, which are essential for leading the lubricant dose alternately to different lubrication points, are thereby effected by alternate pressurization of the body pipes in such a way that the pressure in one body pipe pushes the control valve to another position and the pressure in the other body pipe pushes the control valve back. A drawback in this kind of system is that two pipes must be installed between the pump and the dosers. However, such double piping is expensive and more complicated to install.

To eliminate this drawback, dosers have been developed that can be connected to the pump with one body pipe, whereby any drawbacks of double piping are eliminated. An example of dosers and systems of this kind is provided by the solution described in Finnish Patent 66,978. A drawback in the above solution is, however, that it cannot be quite well applied to all lubricants. Problems may occur with difficult greases, i.e. greases in which oil and soap tend to separate. Another drawback is e.g. insufficient pressurization of one side of the doser caused by a difference in the surface area of the control valve.

SUMMARY OF THE INVENTION

An object of the invention is to provide an arrangement for a lubricant doser by which the drawbacks of the prior art can be eliminated. This has been achieved by the arrangement according to the invention, which is characterized in that means for leading lubricant comprise a stem in a cylinder, the stem being fitted both to move back and forth in the axial direction by the action of the pressure of the lubricant an due to spring power and to turn about the longitudinal axis of symmetry thereof, and that the stem is provided with channels so that, by the movement of the stem the lubricant is allowed to flow to one side of either the control valve or the dosing piston depending on the doser, and, accordingly, by each next movement of the stem following a backward motion, to the other side of either the control valve or the dosing piston.

The main advantage of the invention is that the arrangement can be advantageously applied to all kinds of lubricant, even to the above-mentioned difficult greases. Furthermore, lubrication is effected on both sides of the doser with full pressure of the main supply line, controlling the conventional dosers of a double piping system. Another advantage is that the arrangement according to the invention is simple and quick to install. The arrangement according to the invention can be used to the advantage in connection with conventional dosers for a double piping system, whereby the utilization of the invention becomes advantageous. For utilization of the invention, it is not absolutely necessary to design and manufacture a separate doser, but dosers already manufactured and used can be used. However, by means of the invention, it is also possible to provide a structure that replaces the conventional doser used previously. By means of the invention, all previously known advantages of single pipe systems are retained, while their defects and drawbacks are eliminated and full pressure pressurization of both sides of the doser and applicability to all kinds of lubricant are achieved. Further advantages are possibility of using a grease of the class NLGI-2, possibility of controlling and broadening the system, unnecessity of electricity, great acceptability of residual pressure, and possibility of using great doses. Applicability to all kinds of lubricant is also achieved.

BRIEF DESCRIPTION OF THE DRAWINGS

In the following, the invention is described in more detail with reference to the preferred embodiments of the invention shown in the attached drawings, in which.

DETAILED DESCRIPTION

Figure 1:
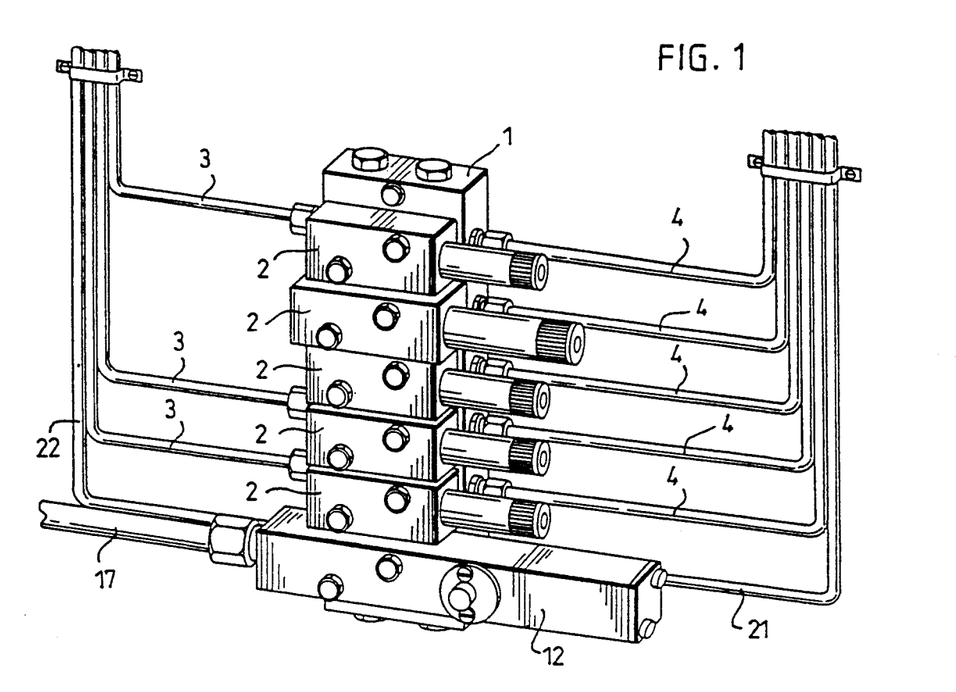
FIG. 1 shows a perspective view of a first embodiment of the arrangement according to the invention.

FIG. 1 shows a perspective view of a first embodiment of the arrangement according to the invention. In this embodiment, conventional dosers that are well known in the field and used in double piping systems are used. The reference numeral 1 in FIG. 1 indicates a bed plate onto which dosers 2 are attached. The reference numerals 3 and 4 in FIG. 1 indicate lubricant pipes leading from the dosers 2 to lubrication points.

Figure 2:
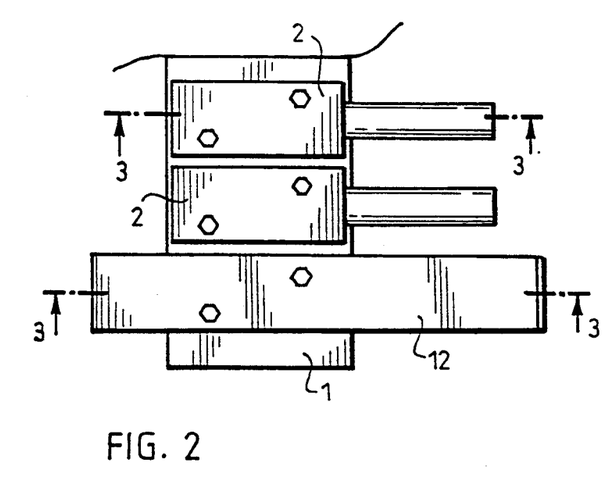
FIG. 2 shows a fragmentary front elevational view of the lower portion of the doser arrangement of FIG. 1, on a larger scale.
Figure 3:
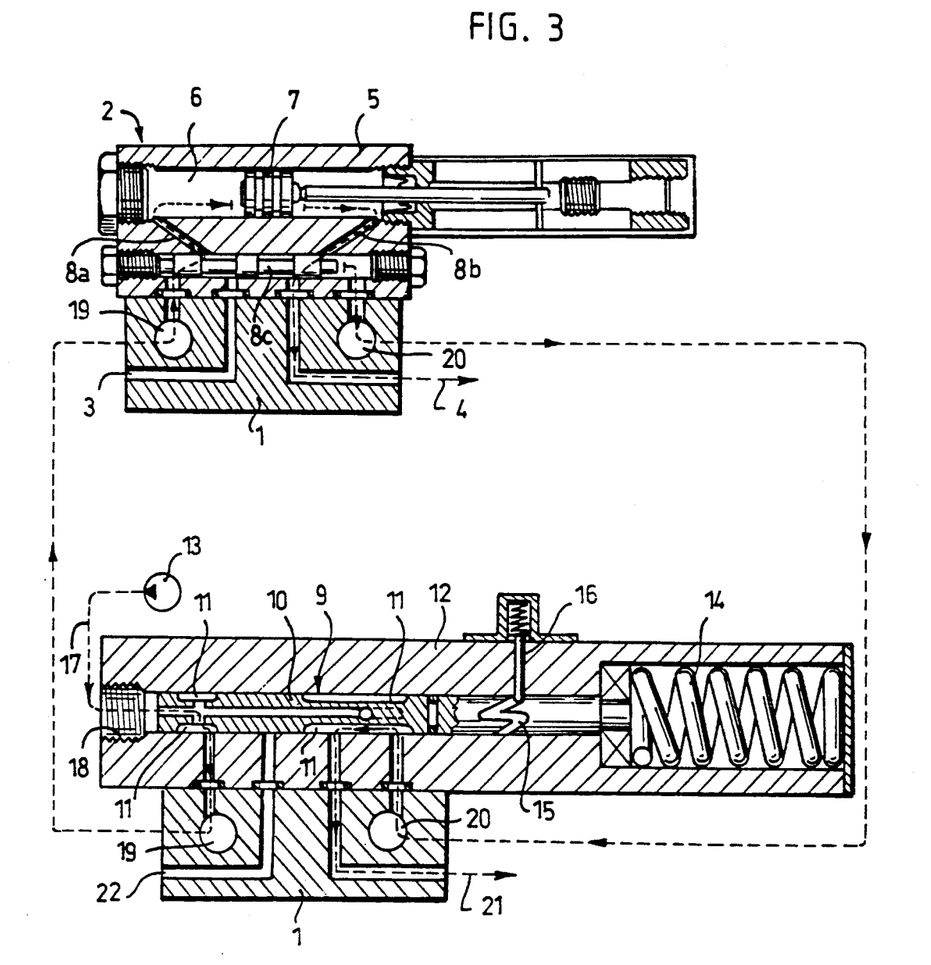
FIG. 3 is a longitudinal sectional view of a minimal system according to the first embodiment, including one doser, one adapter body portion and one bed plate, with these elements being sectioned along lines 3—3 indicated on FIG. 2 and shown as these elements in one operational situation.
Figure 4:
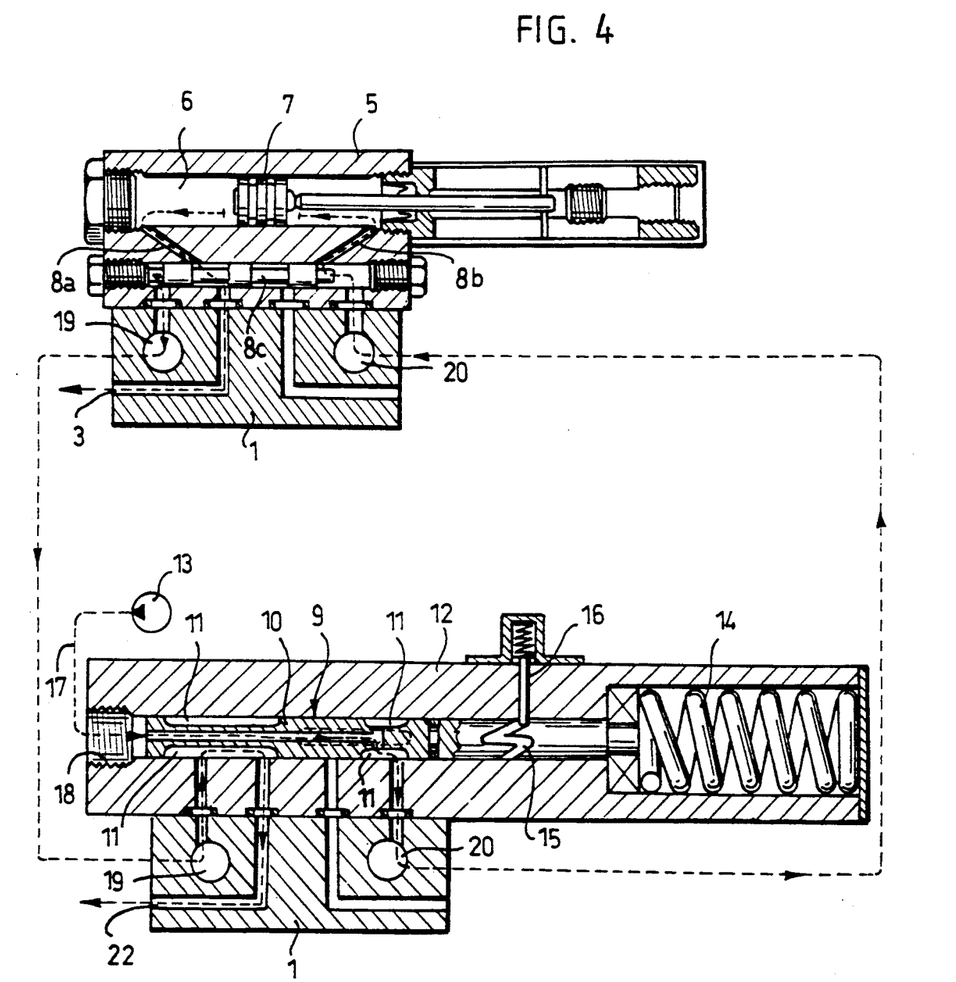
FIG. 4 is a longitudinal sectional, view similar to 3, showing the same elements in another operational situation.

FIG. 2 shows a view of the arrangement according to FIG. 1 seen from above, and correspondingly FIGS. 3 and 4 show cross-sectional views of the embodiment according to FIGS. 1 and 2, taken in the directions indicated by the respective arrows in FIG. 2.

The lubricant dosers 2 shown in the Figures comprise a body 5 having a dosing cylinder 6 and a dosing piston 7 moving axially therein as well as means 8a, 8b, 8c i.e. lubricant channels, a control valve, etc., to lead the lubricant alternately to both sides of the dosing piston 7. The lubricant channels are indicated in FIG. 3 by the reference numerals 8a and 8b, and the control valve is indicated by the reference numeral 8c. The structure and operation of each lubricant doser 2 are quite conventional, and so they are not described in more detail in this document. The essential feature is that the channels and the control valve are included in the means 8a, 8b and 8c by which the lubricant is led alternately to different sides of the dosing piston as desired.

In the arrangement which is disclosed with reference to FIGS. 1 to 6, the means for leading the lubricant alternately to both sides of the dosing piston 7 comprise a stem 10 in a cylinder 9, the stem being fitted both to move back and forth in the axial direction and to turn about the longitudinal axis of symmetry thereof during each backward motion. The stem 10 is also provided with channels 11 so that during the axial movement of the stem the lubricant is allowed to flow to one side of either the control valve or the dosing piston, depending on the doser, and, accordingly, during each next axial movement following a backward motion, to the other side of either the control valve or the dosing piston.

In the embodiment of FIGS. 1 to 4 the stem 10 is fitted to the separate cylinder 9 provided in a body portion 12, the cylinder being capable of being fitted to have flow contact with the lubricant doser. The body portion 12 can be fitted to the same bed plate 1 as the dosers 2. Such an arrangement is shown particularly clearly in FIG. 1.

The axial movement of the stem 10 is effected by the pressure of the lubricant fed to the cylinder 9 by means of a pump 13 and the backward motion is effected by opposing force provided by a spring 14. The circular movement of the stem 10 during the backward motion is effected by joint operation of a groove 15 provided on the surface of the stem and a pin 16 that can be pushed into the groove. The groove 15 and the channels 11 can be fitted, e.g., in such a way that the stem 10 turns essentially 90° during each backward motion thereof, whereby the channels open to the surface of the stem 10 at 90° intervals. The lubricant is fed to the cylinder 9 through one body pipe 17.

The arrangement according to FIGS. 1 to 4 operates, in principle in, the following manner: A control unit of the lubricant system starts the pump 13, which provides a flow of the lubricant through one body pipe (i.e., header line) 17 to an inlet 18 provided in the body portion 12 and further to the cylinder 9 and the channels 11 of the stem 10. The channels 11 in the beginning having flow contact with a pressure line 19 of the bed plate 1.

When the pressure of the lubricant increases in the cylinder 9, the stem 10 begins to move axially to the right against the force of the spring 14. On account of the shape of the channels 11, the flow route of the lubricant to the pressure line 19 of the bed plate 1 remains open, the lubricant flowing to the left-hand side of a control valve 8c of the doser. Accordingly the control valve begins to move to the right and the lubricant is allowed to flow along an opening channel 8a to the left-hand side of the piston 7 of the doser. The lubricant flowing to the left-hand side of the piston pushes the piston to the right, whereby the lubricant on the right-hand side of the piston pushes itself by the action of the movement of the piston 7 to the lubrication point of the doser concerned, through a channel 8b and a lubrication pipe 4 attached to the bed plate 1. The flow of the lubricant is indicated in FIG. 3 by with an arrow.

When the control valve 8c of the doser moves to the right, the lubricant flows to the right thereof, first to a pressure line 20 of the bed plate and from there further through the channels 11 of the stem 10 and through the bed plate 1 and a pipe 21 attached thereto to the lubrication point. This flow is indicated in FIG. 3 by with an arrow.

Figure 5:
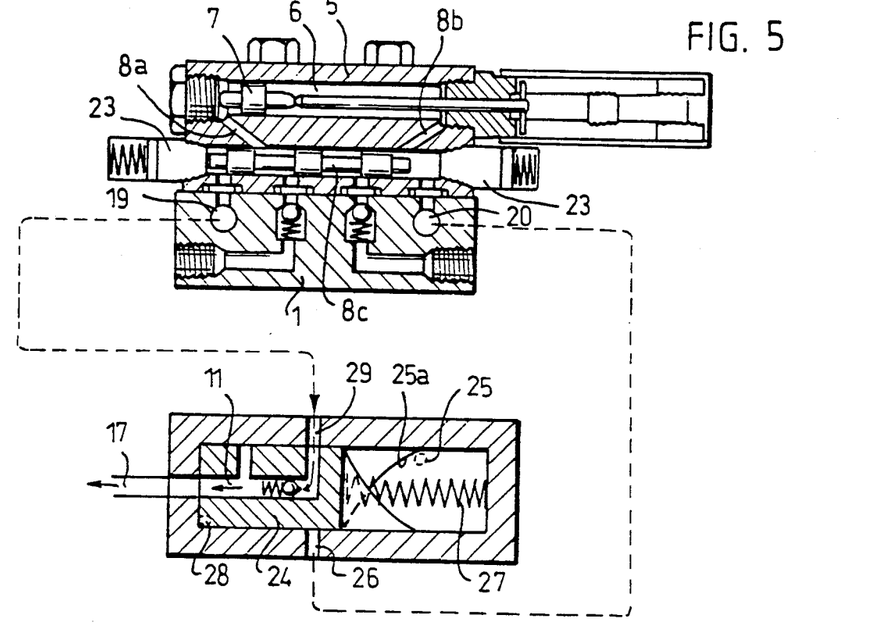
FIGS. 5-8 show a second embodiment of the arrangement according to the invention in different operational situations.

When the pressure reaches a set value the pump stops, whereby the stem 10 moves to the left by the action of the spring 14, simultaneously turning 90° about its axis of symmetry, the result being the situation shown in FIG. 5.

After a predetermined interval, the control unit starts the pump 13, whereby the lubricant flows along the body pipe 17 to the inlet 18 provided in the body portion 12, and further to the cylinder 9 and the channels 11 of the stem 10, the channels in this situation, i.e. after the stem has turned, having flow contact with the pressure line 20 of the bed plate 1.

During pressurization the stem 10 moves to the right against the force of the spring 14. On account of the shape of the channels 11, the lubricant is allowed to flow during the rightward movement of the stem, in the manner shown in FIG. 4 through the pressure line 20 to the right-hand side of the control valve 8c of the doser, whereby the control valve 8c moves to the left when the pressure increases and the lubricant is allowed to flow along the channel 8b to the right-hand side of the dosing piston 7. Thereby, the piston 7 moves to the left, simultaneously pushing the lubricant from the left-hand side thereof, through a channel 8a and a pipe 3 attached to the bed plate 1, to the lubrication point.

Figure 6:
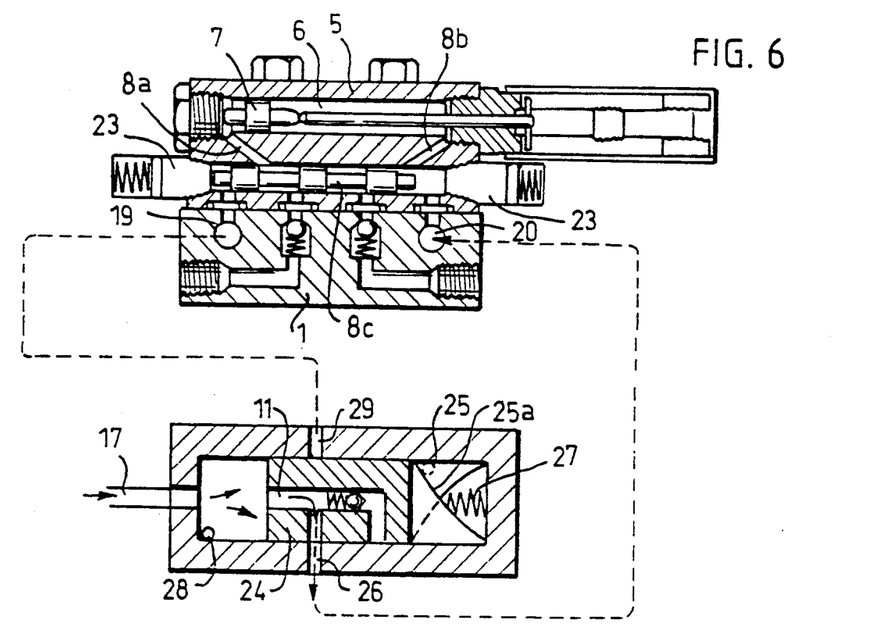
Figure 7:
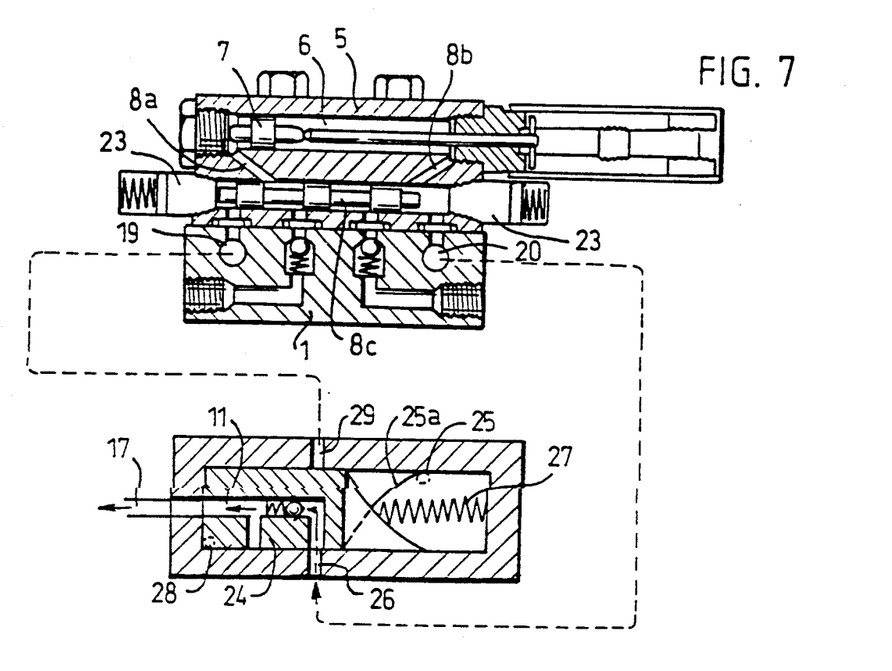

When the control valve 8c moves to the left the lubricant flows from the left-hand side thereof first to the pressure line 19 of the bed plate 1 and from there further along a pipe 22 attached to the bed plate 1 to the lubrication point, as shown in FIGS. 5 and 6.

When the pressure reaches a set value, the pump 13 stops and the stem 10 begins to move to the left due to the action of the spring 14. During this so-called backward motion, the stem again turns 90° about its axis of symmetry, the result being the situation shown in FIG. 3, and the operation continues as described above with reference to FIG. 3. The above described operations can naturally be repeated as many times as desired.

FIGS. 5–8 show, in principle, the operation of a second arrangement according to the invention. Even in this embodiment, the stem is fitted to a separate cylinder provided in the body portion, the cylinder being capable of being fitted to have flow contact with the doser.

In the embodiment of FIG. 5–8 the doser is essentially the same as the doser described in the examples of FIGS. 1 to 4. The only difference is that in the second embodiment two resetting containers 23 have been added to the doser. The bed plate is also similar to that of the first embodiment. As regards the doser and the bed plate, the same reference numerals are used in the corresponding places in FIGS. 5–8 as in FIGS. 1 to 4.

The embodiment according to FIGS. 5–8 operates, in principle, in the following manner. When the lubricating unit is started, the pressure increases in a body pipe 17, whereby a stem 24 moves to the right, simultaneously turning by the action of a leading pin 25 and a surface 25a provided in the stem 24, the result being the situation shown in FIG. 6, in which a contact is effected through a coupling means 26 of the channels 11 of the stem 24 to the pressure line 20 of the bed plate 1. The channels 11 can also be shaped in such a way that the flow connection to the pressure line 20 is open during the whole turning advancing movement of the stem. When the control valve 8c of the doser moves by the action of the lubricant, the lubricant on one side of the control valve moves to the resetting container 23 and the lubricant is allowed to flow to the right-hand side of the dosing piston 7. The operation of the doser corresponds to that of the doser described in the previous example. When the pressurization has stopped, the stem 24 moves by the action of a spring 27 to the position shown in FIG. 7, whereby the pressure is reset to zero.

In this embodiment, the left-hand end of the stem 24 comprises a control member 28 which moves, i.e. turns, the stem to the right position over a so-called dead point for new pressurization.

Figure 8:
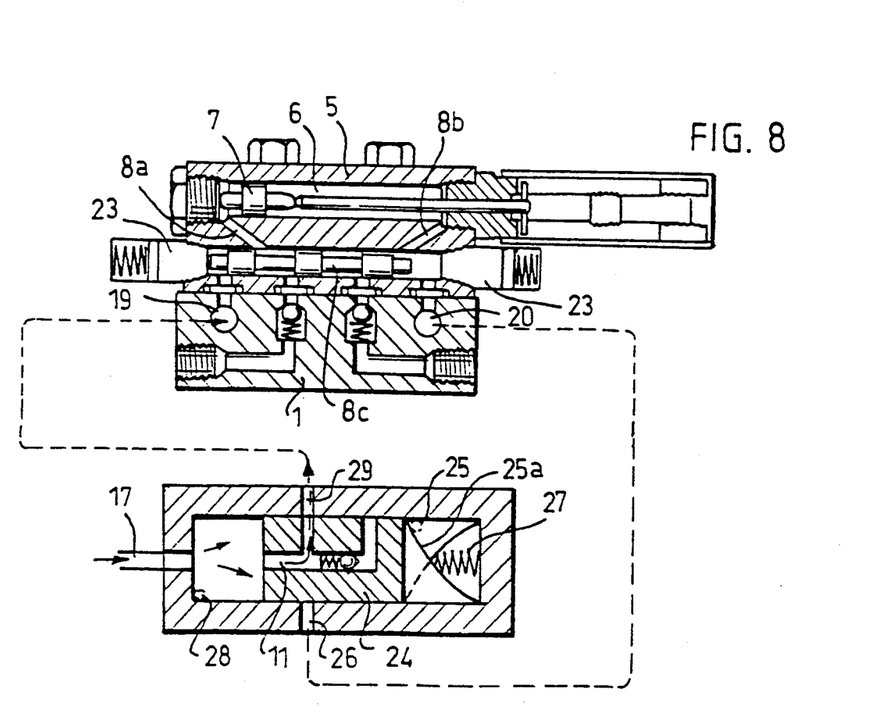

When the pressurization has been re-started, the stem 24 moves to the position shown in FIG. 8, thus effecting a contact through a coupling means 29 to the pressure line 19 of the bed plate 1. When the pressurization has stopped, the stem 24 moves to the position shown in FIG. 7.

Figure 9:
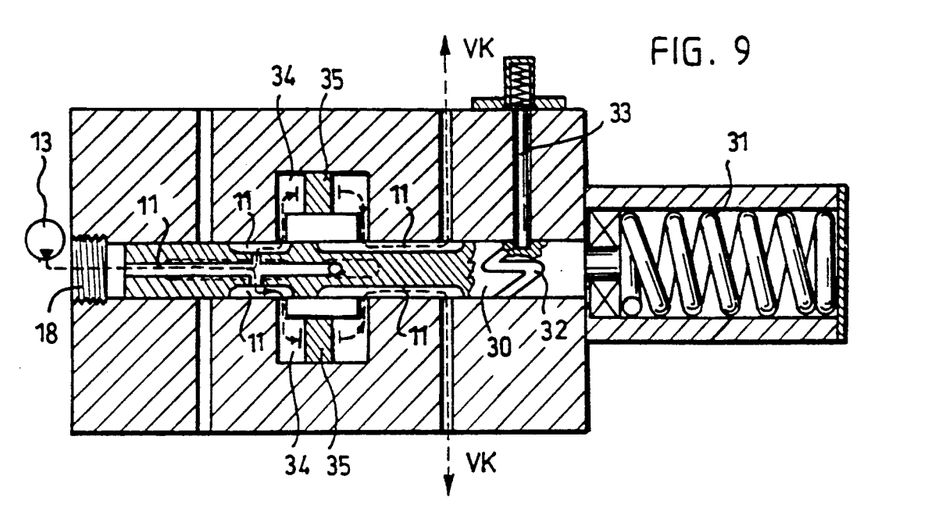
FIGS. 9 and 10 show a third embodiment of the arrangement according to the invention in different operational situations.
Figure 10:
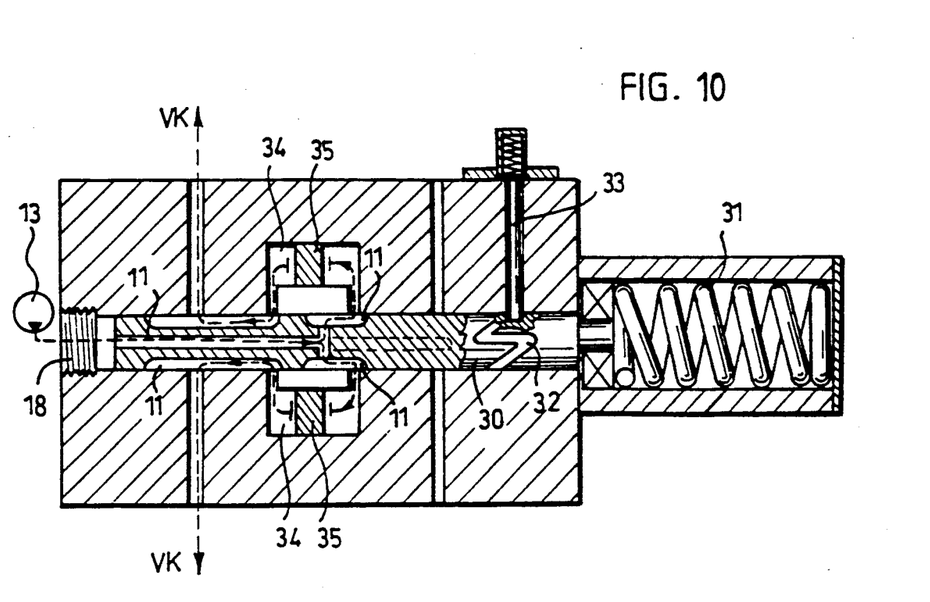

FIGS. 9 and 10 show a third embodiment of the arrangement according to the invention. In this embodiment, a stem 30 is fitted to the same body with the lubricant doser. The operation of the stem 30 is similar to what is described above in connection with FIGS. 1 to 4, i.e. the stem turns about its axis of symmetry during the backward motion effected by a spring 31. The turning is effected by a groove 32 provided on the surface of the stem and a pin 33 that can be pushed into the groove. In this embodiment, the stem leads the lubricant directly to a dosing cylinder 34 alternately to both sides of a dosing cylinder 35. In the examples of FIGS. 9 and 10 there are two dosing cylinders.

The embodiment according to FIGS. 9 and 10 operates in principle in the following manner: The pressure of the lubricant from the pump 13 moves the stem 30 to the right. The lubricant is allowed to flow through the channels 11 of the stem to the left-hand side of the dosing piston 35 continually throughout pressurization, without restriction. In the example of FIGS. 9 and 10 the lubricant flows naturally to both dosing cylinders. The dosing piston 35 is moved to the right by the action of the pressure of the lubricant, whereby the quantity of the lubricant on the right-hand side of the piston moves through the channels 11 of the stem directly to lubrication points LP.

When the pressurization has stopped, the stem 30 turns during the backward motion effected by the spring 31, to the position shown in FIG. 10.

When the pump 13 has been re-started, the pressure of the lubricant flowing to the inlet 18 moves the stem 30 to the right. The lubricant is allowed to flow through the channels 11 to the dosing cylinder to the right-hand side of the dosing piston continually throughout pressurization, without restriction. Even in this situation, the lubricant flows to both dosing cylinders. The lubricant flowing to the dosing cylinder moves the dosing piston to the left, whereby the quantity of the lubricant on the left-hand side of the dosing piston moves through the channels 11 directly to the lubrication point or points LP.

When the pressurization has stopped, the spring 31 presses the stem 30 back, whereby it turns about its axis of symmetry. After this movement, the arrangement is as shown in FIG. 9.

In the examples of FIGS. 9 and 10 the lubricant is led to different points. However, it is also possible to combine the lubrication channels and to provide an arrangement in which the percussion length of the pistons, i.e. the quantity of the lubricant, can be controlled.

The above-described working examples are by no means intended to restrict the invention, but it is obvious that the invention can be freely modified within the scope of the claims. It is thus evident that an arrangement according to the invention or details thereof need not necessarily be exactly the same as shown in the Figures but that other kinds of solution are also possible. For example, the groove/pin arrangement for effecting the turning of the stem can be carried out in various ways. For example, it is possible to use a fixed pin or a spring-loaded pin, a pin with a ball at the end thereof, a pin with a curved end, etc., and a groove with a round bottom, a groove with a flat bottom, a groove provided with a spring means, a groove with a bottom varying in depth, etc.

I claim:

1. A lubricating grease doser arrangement with improved flow control for preventing lubricant oil-hardener separation, for supplying charges of grease from a single control-pressurized supply thereto, alternately to each of two lubricant outlet lines connected therewith; said doser arrangement comprising:

a body means having means defining an axially elongated cylinder therein;

a valve stem axially slidingly received in said cylinder;

spring means engaged between said body means and said valve stem for resiliently tending to force said valve stem towards one end of said cylinder;

means defining an inlet port through said body means to said one end of said cylinder, for connection with a single control-pressurized supply of lubricating grease for application to said valve stem in a sense to force said valve stem to slide in said cylinder towards said spring means, thereby resiliently compressing said spring means;

means defining two outlet ports from said cylinder through said body means, for connection with respective device-lubricating lines;

a system of channels within and upon said valve stem for alternately communicating said one end of said cylinder with each of said outlet ports;

cooperating cam groove and cam-follower pin means provided on said valve stem and said body for causing said valve stem, for each time said valve stem is returned by recovery of said spring towards said one end of said cylinder after pressurized supply of lubricating grease to said inlet port is terminated, to rotate around the longitudinal axis of the valve stem, by a predetermined angular increment, such as to effectively place the valve stem alternately in two different conditions while the valve stem is at rest following termination of pressurized supply of grease to said inlet port, and while said valve stem is moving towards said spring means due to pressure being applied to said valve stem by pressurized supply of lubricating grease to said inlet port, said two different conditions being:

one in which said one end of said cylinder is communicated with one of said outlet ports but cut off from the other of said outlet ports; and another in which said one end of said cylinder is communicated with said other of said outlet ports but cut off from said one of said outlet ports.

2. The doser arrangement of claim 1, wherein:
said cam groove and cam follower pin means are configured so as to cause said valve stem to rotate by said predetermined angular increment each time while said valve stem is being returned towards said one end of said cylinder by recovery of said spring means.

3. The doser arrangement of claim 1, wherein:
said predetermined angular movement is 90 degrees.

4. The doser arrangement of claim 1, wherein:
said cam groove and cam follower pin means are configured so as to cause said valve stem to rotate by said predetermined angular increment each time while said valve stem is being caused to compress said spring means to a predetermined extent by action of pressurized supply of grease against said valve stem.

5. The doser arrangement of claim 1, wherein:
said channels are so configured as to provide substantially full channel communication between the inlet port and the respective said outlet port except temporarily each time as said cam groove and cam-follower pin means is angularly rotating said valve stem by a respective predetermined angular increment.

6. The doser arrangement of claim 1, further including:
at least one additional lubricant doser, having at least one inlet port and at least one outlet port, and internal valve means arranged to supply lubricant received under pressure through a respective said inlet port thereof to a respective outlet port thereof, upon predetermined lubricant pressurize-induced movement of said valve means; and pressure line means effectively connecting each said inlet port of each said additional lubricant doser with said cylinder in parallel with a respective outlet port of said body means.

* * * * *